(12) United States Patent
DeChristopher (10) Patent No.: US 12,490,666 B2
(45) Date of Patent: Dec. 9, 2025

(54) AGRICULTURAL HEADER WITH STEERABLE REAR WHEEL ASSEMBLY

(71) Applicant: CNH Industrial America LLC, New Holland, PA (US)

(72) Inventor: David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 661 days.

(21) Appl. No.: 17/955,128

(22) Filed: Sep. 28, 2022

(65) Prior Publication Data

US 2023/0097154 A1    Mar. 30, 2023

Related U.S. Application Data

(60) Provisional application No. 63/249,786, filed on Sep. 29, 2021.

(51) Int. Cl.
*A01B 73/00* (2006.01)
*B62D 13/04* (2006.01)
(Continued)

(52) U.S. Cl.
CPC ............ *A01B 73/005* (2013.01); *B62D 13/04* (2013.01); *A01B 69/007* (2013.01); *A01B 73/06* (2013.01);
(Continued)

(58) Field of Classification Search
CPC ..... A01B 69/007; A01B 73/005; A01B 73/06; A01C 7/208; A01D 41/06; A01D 41/12;
(Continued)

(56) References Cited

U.S. PATENT DOCUMENTS 2,833,105 A * 5/1958 Naery ................. A01B 73/005
56/192
3,721,461 A * 3/1973 Nelsen ................ A01B 73/005
172/240
(Continued)

FOREIGN PATENT DOCUMENTS

DE    102015116575 A1    3/2017
EP         2939519 A1 *  11/2015    ........... A01D 41/144

*Primary Examiner* — Arpad Fabian-Kovacs
(74) *Attorney, Agent, or Firm* — Buchanan Ingersoll & Rooney PC (57) ABSTRACT

An agricultural header includes: a header frame; a cutter carried by the header frame; a steering assembly coupled to the header frame and including an axle; and a transport assembly coupled to the header frame. The transport assembly includes: a first arm coupled to the header frame and movable between a first transport position and a first operating position; a first wheel mount pivotably coupled to the first arm; a second arm pivotably coupled to the header frame and movable between a second transport position and a second operating position; a second wheel mount pivotably coupled to the second arm; and a linkage reversibly coupling the first wheel mount to the second wheel mount and coupled to the axle such that the second arm is movable independently of the first arm when the linkage is uncoupled from at least one of the first wheel mount or the second wheel mount.

18 Claims, 5 Drawing Sheets

(51) Int. Cl.
*A01B 69/00* (2006.01)
*A01B 73/06* (2006.01)
*A01C 7/20* (2006.01)
*A01D 41/06* (2006.01)
*A01D 41/12* (2006.01)
*A01D 75/00* (2006.01)
*B62D 13/00* (2006.01)
*B62D 13/02* (2006.01)
*B62D 63/06* (2006.01)

(52) U.S. Cl.
CPC .............. *A01C 7/208* (2013.01); *A01D 41/06* (2013.01); *A01D 41/12* (2013.01); *A01D 75/002* (2013.01); *B62D 13/00* (2013.01); *B62D 13/025* (2013.01); *B62D 63/062* (2013.01)

(58) Field of Classification Search
CPC .... A01D 75/002; A01D 75/004; B62D 13/00; B62D 13/025; B62D 13/04; B62D 63/062
See application file for complete search history.

(56) References Cited

U.S. PATENT DOCUMENTS

| | | | | |
|---|---|---|---|---|
| 4,435,948 A * | 3/1984 | Jennings | .............. | A01B 73/005 56/192 |
| 5,243,810 A * | 9/1993 | Fox | .................... | A01D 75/002 56/14.4 |
| 5,562,167 A * | 10/1996 | Honey | .................... | A01B 73/00 172/385 |
| 6,209,297 B1 * | 4/2001 | Yeomans | .............. | A01B 73/005 56/228 |
| 6,260,629 B1 * | 7/2001 | Toth | ..................... | A01B 73/005 172/278 |
| 7,197,865 B1 * | 4/2007 | Enns | ..................... | A01D 41/14 56/228 |
| 7,552,579 B2 * | 6/2009 | Tippery | ............... | A01B 73/005 56/228 |
| 7,874,571 B2 | 1/2011 | Frey et al. | | |
| 7,926,249 B1 * | 4/2011 | Cook | ................... | A01B 73/005 172/240 |
| 7,963,361 B2 | 6/2011 | Coers et al. | | |
| 8,025,312 B1 * | 9/2011 | Honas | .................. | A01D 75/002 56/228 |
| 8,870,210 B2 | 10/2014 | Smith | | |
| 8,931,797 B2 | 1/2015 | Gaerke et al. | | |
| 9,187,024 B2 | 11/2015 | Bojsen | | |
| 9,596,808 B2 * | 3/2017 | Fay, II | ................. | A01B 73/005 |
| 9,828,051 B2 | 11/2017 | Gray et al. | | |
| 10,980,181 B2 * | 4/2021 | Sudbrack | ................ | B60P 3/066 |
| 11,490,564 B2 * | 11/2022 | LaVally | ............... | A01B 73/005 |
| 12,035,646 B2 * | 7/2024 | Chen | .................... | A01B 59/064 |
| 2004/0011538 A1 * | 1/2004 | Raducha | ................ | A01B 73/005 172/311 |
| 2007/0144132 A1 * | 6/2007 | Enns | .................... | A01B 73/005 56/228 |
| 2014/0151977 A1 * | 6/2014 | Gaerke | .................. | B62D 13/04 280/442 |
| 2018/0310462 A1 * | 11/2018 | Chen | ...................... | A01D 41/06 |
| 2020/0053949 A1 | 2/2020 | Chen et al. | | |
| 2020/0055545 A1 * | 2/2020 | Chen | ..................... | A01B 73/06 |
| 2021/0307247 A1 * | 10/2021 | Lyons | .................. | A01D 75/004 |
| 2022/0304217 A1 * | 9/2022 | Bietz | ..................... | A01D 41/06 |

* cited by examiner

AGRICULTURAL HEADER WITH STEERABLE REAR WHEEL ASSEMBLY

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Many known headers have operating widths of 40 feet or greater that make the headers unsuitable for transport on public roads in the operating position. In order to transport such headers on public roads, the header must be transported at an orientation that is perpendicular to the normal operating orientation. To stabilize the header in the transport orientation, one or more transport wheel assemblies are deployed. While such transport wheel assemblies are effective, deploying the assemblies, and storing the assemblies when they are no longer needed, is often cumbersome. Automatic systems have been developed to deploy and store the transport wheel assemblies, but these automatic systems can be too expensive and complicated for many users to adopt. Further, the high operating width of the header makes it difficult to turn the header.

What is needed in the art is an agricultural header that addresses some of the previously described issues with known agricultural headers.

SUMMARY OF THE INVENTION

Exemplary embodiments provided according to the present disclosure include a transport assembly with a first arm and a second arm each carrying a respective wheel mount that can pivot relative to the arm, with the arms being movable independently from one another.

In some exemplary embodiments provided according to the present disclosure, an agricultural header for an agricultural vehicle includes: a header frame; at least one cutter carried by the header frame and configured to cut crop material; a steering assembly coupled to the header frame and comprising an axle that is pivotably coupled to the header frame; and a transport assembly coupled to the header frame. The transport assembly includes: a first arm coupled to the header frame and movable between a first transport position and a first operating position; a first wheel mount pivotably coupled to the first arm and configured to mount a first transport wheel thereto; a second arm pivotably coupled to the header frame and movable between a second transport position and a second operating position; a second wheel mount pivotably coupled to the second arm and configured to mount a second transport wheel thereto; and a linkage coupling the first wheel mount to the second wheel mount and coupled to the axle such that pivoting movement of the axle causes a corresponding pivoting movement of the first wheel mount and the second wheel mount, the linkage being reversibly coupled to at least one of the first wheel mount or the second wheel mount such that the second arm is movable between the second transport position and the second operating position independently of the first arm being movable between the first transport position and the first operating position when the linkage is uncoupled from at least one of the first wheel mount or the second wheel mount.

In some exemplary embodiments provided according to the present disclosure, an agricultural vehicle includes a chassis and an agricultural header carried by the chassis. The agricultural header includes: a header frame; at least one cutter carried by the header frame and configured to cut crop material; a steering assembly coupled to the header frame and comprising an axle that is pivotably coupled to the header frame; and a transport assembly coupled to the header frame. The transport assembly includes: a first arm coupled to the header frame and movable between a first transport position and a first operating position; a first wheel mount pivotably coupled to the first arm and configured to mount a first transport wheel thereto; a second arm pivotably coupled to the header frame and movable between a second transport position and a second operating position; a second wheel mount pivotably coupled to the second arm and configured to mount a second transport wheel thereto; and a linkage coupling the first wheel mount to the second wheel mount and coupled to the axle such that pivoting movement of the axle causes a corresponding pivoting movement of the first wheel mount and the second wheel mount, the linkage being reversibly coupled to at least one of the first wheel mount or the second wheel mount such that the second arm is movable between the second transport position and the second operating position independently of the first arm being movable between the first transport position and the first operating position when the linkage is uncoupled from at least one of the first wheel mount or the second wheel mount.

One possible advantage that may be realized by exemplary embodiments provided according to the present disclosure is that the wheel mounts of the transport assembly can pivot to provide steering of wheels mounted thereto in addition to steering provided by the axle of the steering assembly to reduce the turn radius of the header.

Another possible advantage that may be realized by exemplary embodiments provided according to the present disclosure is that the arms can be separately moved to stow the arms, the wheel mounts, and any mounted wheels in a convenient position for operation.

Yet another possible advantage that may be realized by exemplary embodiments provided according to the present disclosure is that the components of the transport assembly can stay with the header when the transport assembly is not deployed, reducing the risk of the transport assembly components being lost during operation when the transport assembly is not in use.

Yet another possible advantage that may be realized by exemplary embodiments provided according to the present disclosure is that the transport assembly can be stored with the header, which is convenient.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
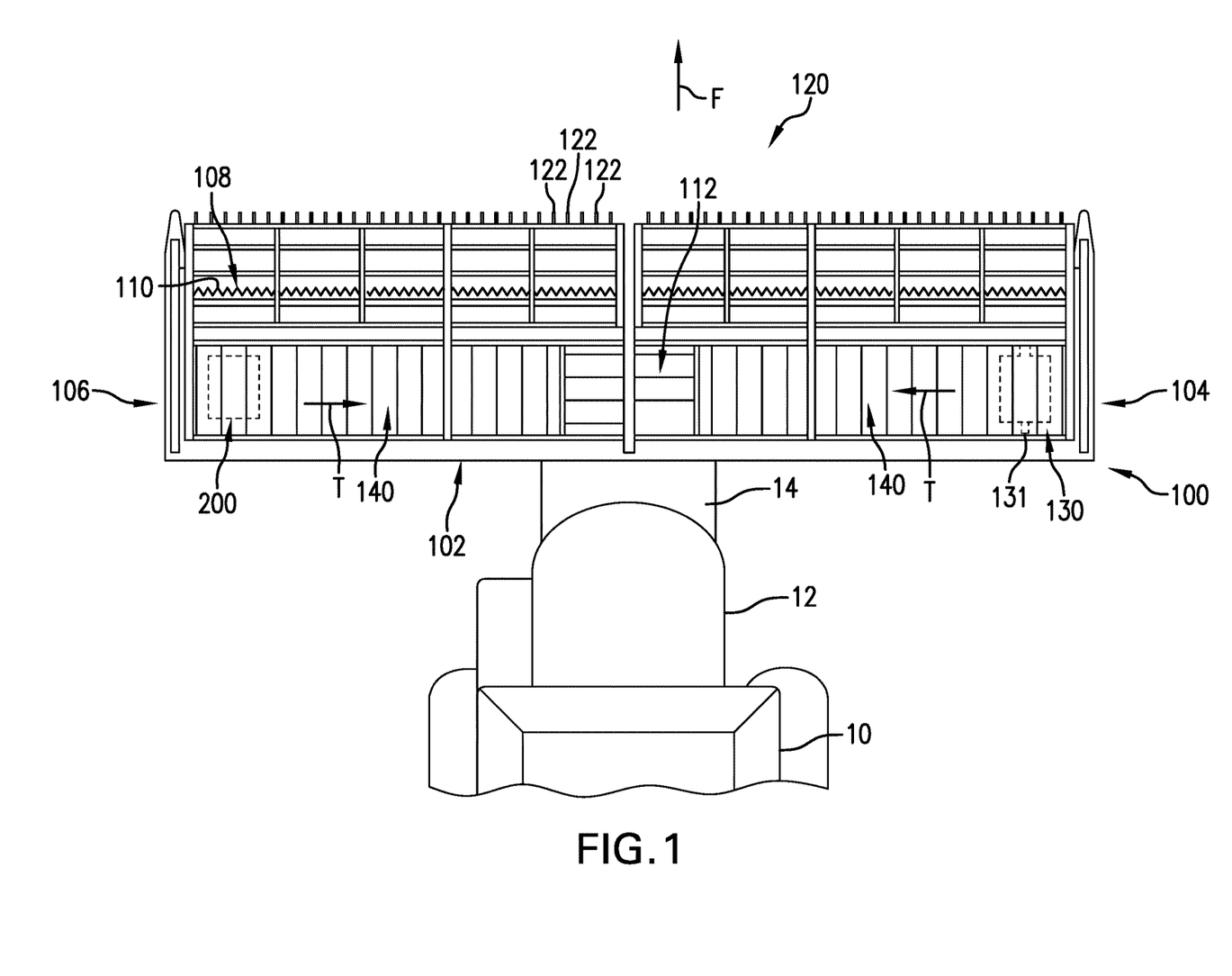
FIG. 1 illustrates a top view of an exemplary embodiment of an agricultural vehicle, the agricultural vehicle comprising an agricultural header, in accordance with an exemplary embodiment of the present invention.

Referring now to the drawings, and more particularly to FIG. 1, there is shown an exemplary embodiment of an agricultural vehicle 10 in the form of a combine harvester which generally includes a chassis 12, a feeder housing 14, and an attachment in the form of an agricultural header 100. Typically, the combine harvester 10 will include additional internal systems for the separation and handling of collected crop material, but these additional systems are omitted from view for brevity of description. It should be appreciated that the header 100 described and illustrated herein does not necessarily need to be included on combine harvesters, but can be incorporated in other agricultural vehicles such as windrowers. Further, while the exemplary embodiment of the header 100 is shown and described as a draper header, it should be appreciated that the header can be formed, in some exemplary embodiments, as an auger-type header incorporating one or more augers as the crop material conveyor(s). It should be further appreciated that while the header 100 is shown and described as being configured for harvesting wheat, in some embodiments the header is configured for harvesting other crops, such as corn.

The header 100 is coupled to the feeder housing 14 and supported by the chassis 12 of the agricultural vehicle 10. The header 100 has a header frame 102 and a pair of opposed lateral ends 104, 106. The header frame 102 supports one or more flexible cutters 108, shown as a cutter bar, with reciprocating cutting edges 110 to cut crop material as the agricultural vehicle 10 travels in a forward direction, denoted by arrow F. The header 100 may further include a center feed belt 112 or a center auger that conveys the crop material into the feeder housing 14. In one exemplary embodiment, the header 100 can include one or more lateral, flexible draper belts 140 that are positioned rearwardly of the cutter bar(s) 108 and travel, i.e. rotate, in opposing directions of travel, denoted by each arrow "T", in order to convey the crop material inwardly to the center feed belt 112 and thereby the feeder housing 14. In some exemplary embodiments, the header 100 may include a pair of counter-rotating cross augers, rather than the draper belts 140, to convey crop material laterally inward toward the center feed belt 112. The vehicle 10 may further include a reel assembly 120 with tines 122 that rotate to direct crop material to the cutter(s) 108 of the header 100, as is known.

The header 100 includes a steering assembly 130, which may be located adjacent to the lateral end 104 of the header 100. The steering assembly 130 includes an axle 131 onto which a pair of wheels may be mounted. The axle 131 is pivotable with respect to the header frame 102 so the wheels connected to the axle 131 are steerable wheels. When the header 100 is being transported, i.e., rotated 90° relative to the orientation illustrated in FIG. 1, the lateral end 104 of the header 100 may be the front end of the header 100 and the lateral end 106 may be the rear end of the header 100.

Referring now to FIGS. 2-5, an exemplary embodiment of a transport assembly 200 provided according to the present disclosure is illustrated being carried by the header frame 102. The transport assembly 200 includes a first arm 210 movably coupled to the header frame 102 and a second arm 220 movably coupled to the header frame 102. The first arm 210 carries a first wheel mount 230 that is configured to mount a first transport wheel 201 thereto and the second arm 220 carries a second wheel mount 240 that is configured to mount a second transport wheel 202 thereto. It should thus be appreciated that the transport wheels 201, 202 are releasably mounted to the wheel mounts 230, 240 and may be released and removed from the wheel mounts 230, 240 for various reasons.

Figure 3:
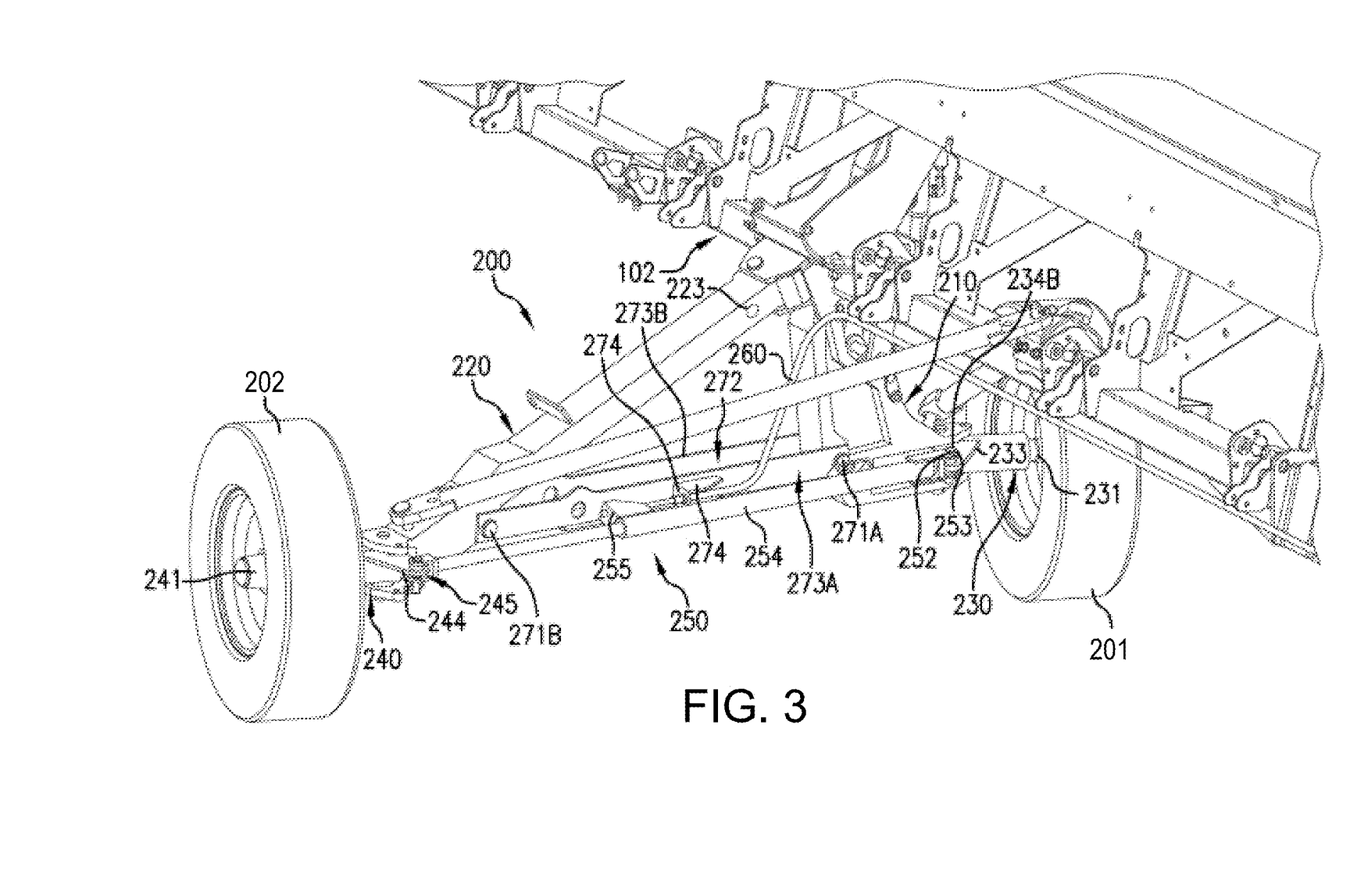
FIG. 3 illustrates another perspective view of the transport assembly of FIG. 2.
Figure 4:
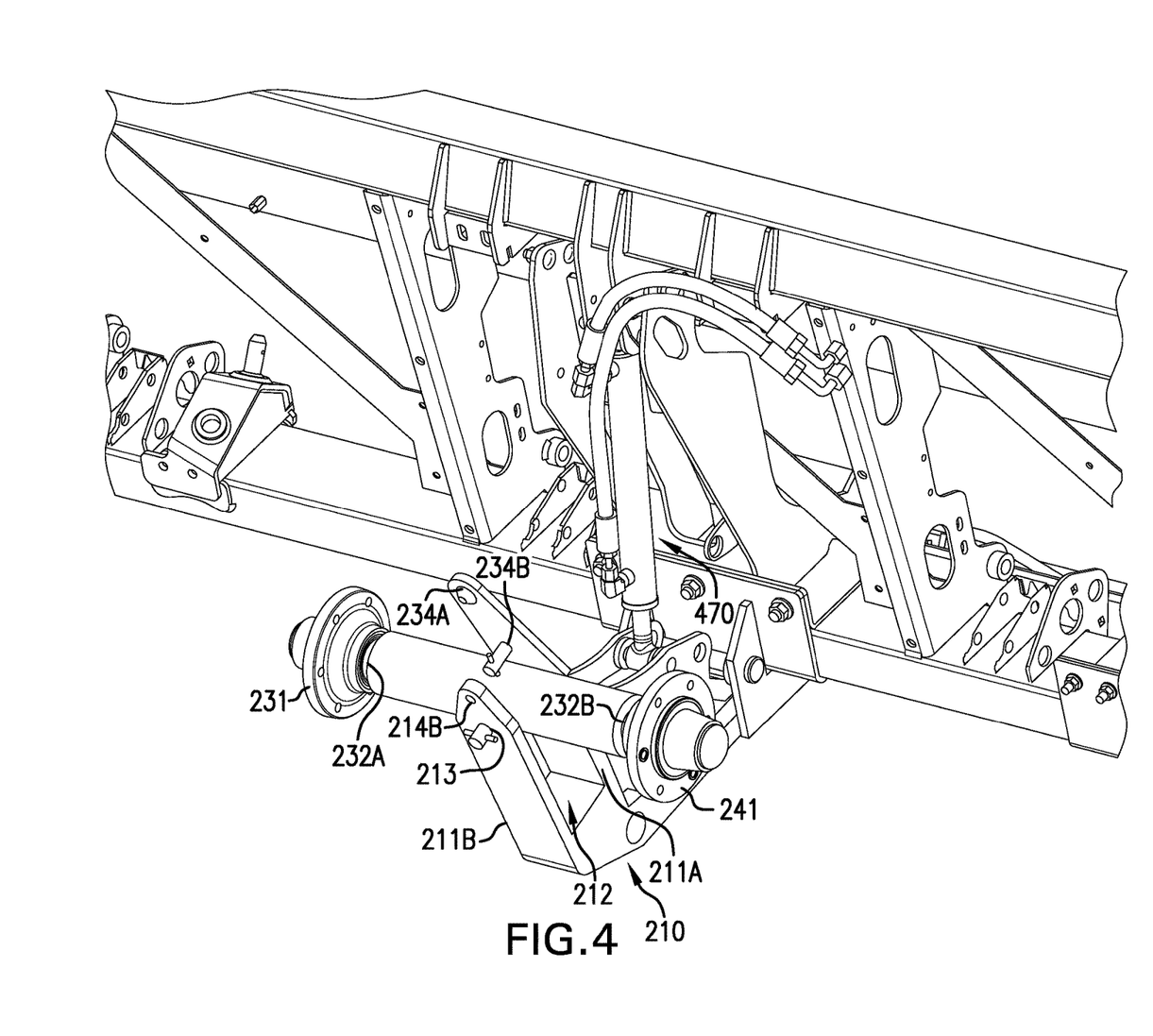
FIG. 4 illustrates the first arm of the transport assembly of FIGS. 2-3 when the first arm has been moved to a first operating position, in accordance with an exemplary embodiment of the present invention.
Figure 5:
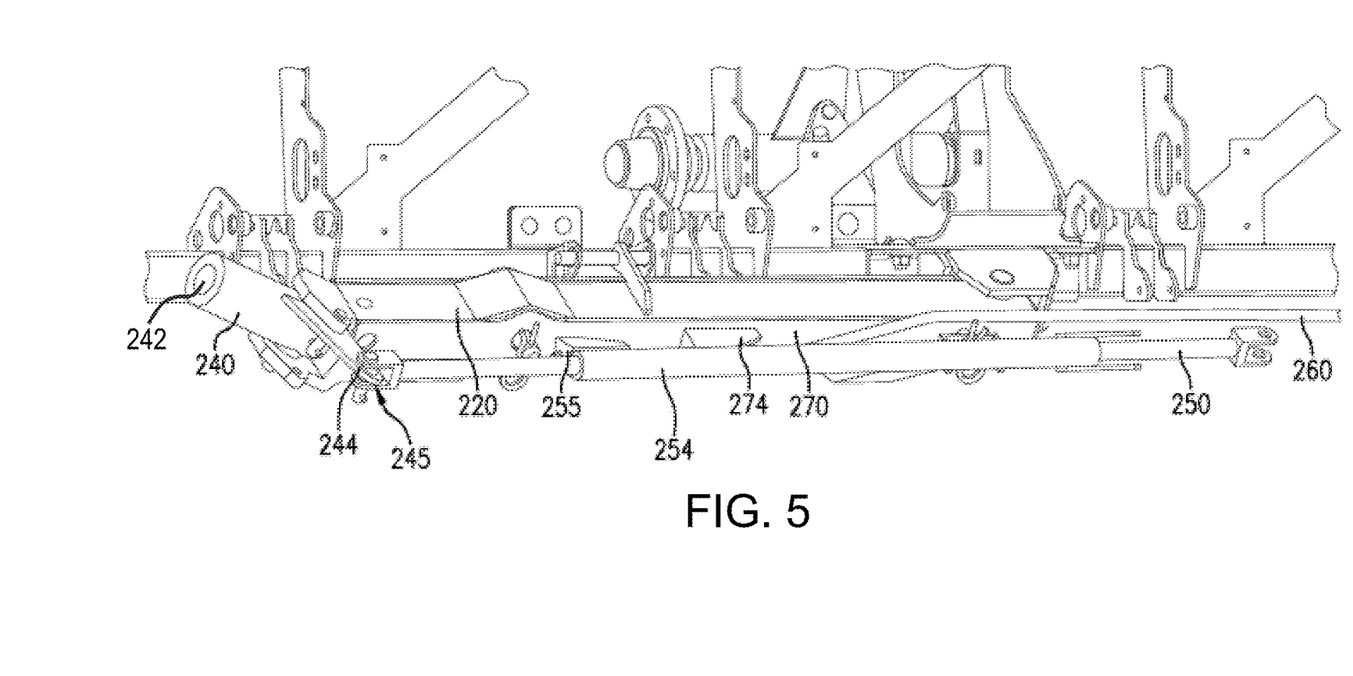
FIG. 5 illustrates the second arm of the transport assembly of FIGS. 2-3 when the second arm has been moved to a second operating position, in accordance with an exemplary embodiment of the present invention.

The first arm 210 and the second arm 220 are both movably coupled to the header frame 102 so the first arm 210 is movable between a first transport position (illustrated in FIGS. 2-3) and a first operating position (illustrated in FIGS. 4-5) and the second arm 220 is movable between a second transport position (illustrated in FIGS. 2-3) and a second operating position (illustrated in FIGS. 4-5). When the arms 210, 220 are in the transport position, the arms 210, 220 are in a position where wheels 201, 202 mounted to the carried wheel mounts 230, 240 can contact the ground to stabilize the header 100 during transport. When the arms 210, 220 are in the operating position, the arms 210, 220 are lifted relative to the ground. The arms 210, 220 may, for example, be pivotable between the respective transport positions and operating positions.

The first wheel mount 230 is pivotably coupled to the first arm 210 and the second wheel mount 240 is pivotably coupled to the second arm 220 so the mounted wheels 201, 202 may be steered. In this respect, the transport assembly 200, which may be a rear wheel assembly of the header 100, is a steerable wheel assembly like the steering assembly 130. Providing both the steering assembly 130 and the transport assembly 200 with steerable wheels 201, 202 can reduce the turn radius of the header 100 during transport, making it easier to transport the header 100.

The wheel mounts 230, 240 are coupled to one another by a linkage 250. In some embodiments, the linkage 250 includes a tie rod coupled to the first wheel mount 230 and the second wheel mount 240. By coupling the wheel mounts 230, 240 together with the linkage 250, the wheel mounts 230, 240 may steer together and reduce the risk of uncontrolled steering. The linkage 250 is also coupled to the axle 131 of the steering assembly 130 such that pivoting movement of the axle 131, i.e., steering, causes a corresponding pivoting movement of the first wheel mount 230 and the second wheel mount 240.

The linkage 250 is reversibly coupled to the first wheel mount 230 and/or the second wheel mount 240 such that the second arm 220 is movable between the second transport position and the second operating position independently of the first arm 210 being movable between the first transport position and the first operating position when the linkage 250 is uncoupled from the first wheel mount 230 and/or the second wheel mount 240. In the illustrated embodiment, the linkage 250 is reversibly coupled to the first wheel mount 230 so the linkage 250 can be uncoupled from the first wheel mount 230 before moving the first arm 210, which carries the first wheel mount 230, between the operating position and the transport position. By being able to move the arms 210, 220 independently from one another, the arms 210, 220 and the carried wheel mounts 230, 240 can be moved to positions that result in a compact configuration.

The linkage 250 may couple to the axle 131 in a variety of ways. In some embodiments, a cable 260 is provided that directly couples the linkage 250 to the axle 131. In this respect, the cable 260 may be coupled to the axle 131 and the linkage 250. In some embodiments, the linkage 250 is coupled to the axle 131 such that a pivotal movement of the axle 131 in a pivoting direction causes a corresponding pivoting of the wheel mounts 230, 240 in an opposite direction. However, it should be appreciated that the axle 131 in the pivoting direction can alternatively cause a corresponding pivoting of the wheel mounts 230, 240 in the same pivoting direction. In some embodiments, the linkage 250 includes an actuator or other mechanism that is coupled to the axle 131 and converts pivotal movement of the axle 131 into a corresponding pivoting of the wheel mounts 230, 240. It should thus be appreciated that the linkage 250 can be configured in a variety of ways to cause corresponding pivoting of the wheel mounts 230, 240 when the axle 131 pivots.

Figure 2:
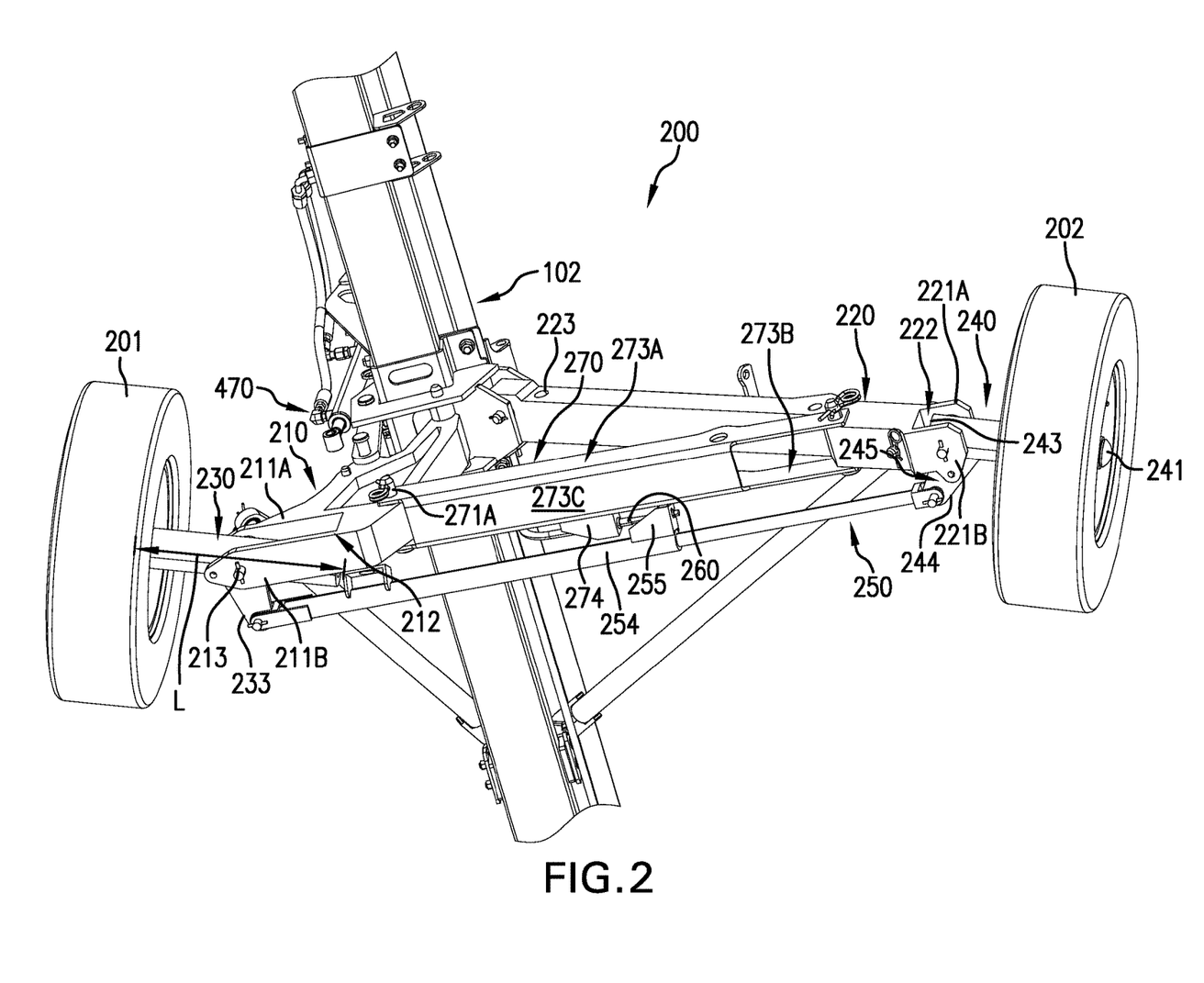
FIG. 2 illustrates an exemplary embodiment of a transport assembly of the header of FIG. 1 with a first arm and a second arm each in respective transport positions, in accordance with an exemplary embodiment of the present invention.

In some embodiments, the first arm 210 includes a pair of first forks 211A, 211B that define a first slot 212 therebetween and the first wheel mount 230 is disposed in the first slot 212. Similarly, the second arm 220 may include a pair of second forks 221A, 221B that define a second slot 222 therebetween and the second wheel mount 240 is disposed in the second slot 222. The first wheel mount 230 may define a length L and be pivotably coupled to the first forks 211A, 211B adjacent to a center of the length L so approximately half of the length L is on one side of the pivotable connection and the other half of the length L is on the other side of the pivotable connection, as best illustrated in FIGS. 2 and 4. The pivotable connection may be, for example, a pivot pin 213 that extends through the first wheel mount 230 and corresponding openings formed in the first forks 211A, 211B. The second wheel mount 240, on the other hand, may be pivotably coupled to the second forks 221A, 221B adjacent to a proximal end 243 of the second wheel mount 240. By pivotably coupling the first wheel mount 230 to the first forks 211A, 211B adjacent to the center of the length L, the first wheel mount 230 can be pivoted to expose opposite ends 232A, 232B of the first wheel mount 230. The wheel hub 231 may be mounted to one of the ends 232A of the first wheel mount 230 at all times while the other wheel hub 241, which may be coupled to one end 242 of the second wheel mount 240 when the second arm 220 is in the transport position, may be mounted to the other end 232B of the first wheel mount 230 when the first arm 210 is in the operating position. In this respect, the second wheel mount 240 can have one end 242 that is configured to accept the respective wheel hub 241 and the first wheel mount 230 can have opposite ends 232A, 232B that are each configured to receive a respective wheel hub 231, 241 and couple to both wheels 201, 202 when the first arm 210 is in the operating position. When the first arm 210 is in the operating position, the wheels 201, 202 mounted to the first wheel mount 230 can act as gauge wheels for the header 100. To further simplify the wheel mounting procedure, the wheel hubs 231, 241 may be configured similarly so each wheel hub 231, 241 can mount to any of the ends 232A, 232B, 242 of the wheel mounts 230, 240. In some embodiments, an arm actuator 470, such as a hydraulic cylinder, is coupled to the first arm 210 and configured to move the first arm 210 between the first transport position and the first operating position. It should thus be appreciated that the first wheel mount 230 can be used to mount both wheels 201, 202 thereto when the first arm 210 is in the first operating position to conveniently stow the wheels 201, 202 and still allow steering when the first arm 210 is in the first transport position.

In some embodiments, the first wheel mount 230 includes a mounting bracket 233 that has at least one opening 234A, 234B. When the first wheel mount 230 is in a first position, as illustrated in FIGS. 2-3, one or more of the openings, such as the opening 234A, aligns with a corresponding opening 252 formed in the linkage 250. By aligning the openings 234A, 252, the linkage 250 can be coupled to the first wheel mount 230 by, for example, placing a fixation pin 253 in the aligned openings 234A, 252. When the first wheel mount 230 is in a second position, as best illustrated in FIG. 4, one or more of the openings, such as the opening 234B, aligns with corresponding openings 214B formed in each of the first forks 211A, 211B. By aligning the opening 234B with the openings 214B of the first forks 211A, 211B, the fixation pin 253 can be used to couple the mounting bracket 233 to the first forks 211A, 211B and stably hold the first wheel mount 230 in the second position while the first arm 210 is in the operating position. Stably holding the first wheel mount 230 in the second position can help keep wheels 201, 202 mounted to the first wheel mount 230 in position and reduce the risk of uncontrolled movement of the wheels 201, 202. In some embodiments, the first arm 210 is reversibly coupled to the second arm 220 such that the first arm 210 is movable to the first operating position when uncoupled from the second arm 220 and held in the first transport position when coupled to the second arm 220. To reversibly couple the first arm 210 to the second arm 220, a cross arm 270 may be provided that is coupled to both of the arms 210, 220 when the arms 210, 220 are in their respective transport positions. The cross arm 270 may be coupled to both of the arms 210, 220 by respective coupling pins 271A, 271B. In some embodiments, the cross arm 270 is open to define an arm slot 272 between two or more walls 273A, 273B, 273C of the cross arm 270. The cross arm 270 may be configured to fold onto the second arm 220 when uncoupled from the first arm 210, as illustrated in FIG. 5, so the cross arm 270 takes up minimal additional room. When folded onto the second arm 220, the cross arm 270 can be held in place by placing the coupling pin 271A in a respective opening 223 of the second arm 220. Thus, the cross arm 270 can reversibly couple the arms 210, 220 together while staying with one of the arms (the second arm 220) at all times and allowing for a compact storage configuration. The linkage 250 may remain coupled to the second wheel mount 240 when the second arm 220 is in the operating position so the linkage 250 remains coupled to at least one of the wheel mounts 230, 240 when the arms 210, 220 are in their respective operating positions. However, it should be appreciated that the linkage 250 may also be uncoupled from both wheel mounts 230, 240 to move the arms 210, 220 to their respective operating positions.

In some embodiments, the cross arm 270 can include a cable holder 274 through which the cable 260 is disposed. Disposing the cable 260 through the cable holder 274 can keep the cable 260 from moving uncontrollably when moving the arms 210, 220 between the operating position and the transport position, allowing the cable 260 to remain coupled to the linkage 250 when moving the arms 210, 220 between the positions. For example, the cable 260 may mount to a sleeve 254 that is disposed over and coupled to the linkage 250 so the components are all allowed to properly move to different positions as the arms 210, 220 move between the respective operating position and the transport position. The sleeve 254 may include a cable bracket 255 to which the cable 260 is mounted.

In some embodiments, the second wheel mount 240 includes a linkage bracket 244 that is coupled to the linkage 250. Unlike the mounting bracket 233, the linkage bracket 244 is configured to couple to the linkage 250 via a ball joint 245 so the linkage 250 (and the coupled cable 260) can stay coupled to the linkage bracket 244, and thus the second wheel mount 240, when the second arm 220 is in both the second operating position and the second transport position. Thus, the linkage 250 and the cable 260 do not need to be disconnected from the second wheel mount 240 to move the second arm 220 between the second operating position and the second transport position, and vice versa, which can reduce the risk of the linkage 250 and/or the cable 260 being lost when moving the second arm 220 between the positions.

When the header 100 is being transported, the first arm 210 and the second arm 220 may be moved to the transport positions illustrated in FIGS. 2-3. Moving the first arm 210 from the first operating position to the first transport position may include uncoupling one or both wheels 201, 202 from the wheel hubs 231, 241 mounted to the first wheel mount 230. The wheel hub 241 may be uncoupled from the first wheel mount 230 and coupled to the second wheel mount 240 before or after moving the first arm 210 to the transport position. The mounting bracket 233 may be uncoupled from the first forks 211A, 211B and coupled to the linkage 250, which may remain coupled to the second wheel mount 240 via the linkage bracket 244, so the first wheel mount 230 and the second wheel mount 240 are coupled together by the linkage 250. The cross arm 270 may also be unfolded from the second arm 220 and coupled to the first arm 210 to hold the arms 210, 220 steady during transport. The linkage 250, by virtue of coupling both of the wheel mounts 230, 240 to the axle 131, allows steering of wheels 201, 202 mounted to the wheel mounts 230, 240 to reduce the turn radius of the header 100.

When the header 100 arrives at a location where the header 100 will operate, the linkage 250 can be uncoupled from the first arm 210 and the first wheel mount 230 can be moved to the second position so both wheel hubs 231, 241 can mount to the first wheel mount 230. The wheel hub 241 may be uncoupled from the second wheel mount 240 and coupled to the first wheel mount 230. The cross arm 270, if included, may also be uncoupled from the first arm 210. The first arm 210 can be moved to the operating position, using the arm actuator 470 or otherwise, and the mounting bracket 233 can be coupled to the first forks 211A, 211B. Wheels 201, 202 can be coupled to the wheel hubs 231, 241 mounted to the first wheel mount 230 to keep the wheels 201, 202 with the transport assembly 200. The second arm 220, meanwhile, may be moved to the second operating position while still connected to the linkage 250. The cross arm 270 may be folded on the second arm 220 and the second arm 220 may be fixated to the header frame 102, holding the second arm 220 in the operating position. Thus, it should be appreciated that the transport assembly 200 provided according to the present disclosure allows for wheels 201, 202 mounted to the wheel mounts 230, 240 to be steerable wheels, where such assemblies usually have fixed wheels, while still allowing components of the transport assembly 200 to be held with the header 100 when placed in an operating configuration with the arms 210, 220 stowed.

It should be appreciated that, in some embodiments, the steering assembly 130 may be configured similarly to the transport assembly 200. The steering assembly 130 may, for example, be configured as a mirror image of the transport assembly 200 illustrated in FIGS. 2-5 and described previously that includes a mount for a tongue. In such a configuration, the axle can be, for example, the linkage. Thus, the transport assembly 200 provided according to the present disclosure can be provided in a variety of locations of the header 100.

From the foregoing, it should be appreciated that the transport assembly 200 provided according to the present disclosure provides a way to have steerable wheels 201, 202 at, for example, the rear of the header 100 while allowing an operator to quickly and easily break down and store the transport assembly 200 with the header 100 after transport and, similarly, quickly and easily deploy the transport assembly 200 for transporting the header 100. The components of the transport assembly 200 may all stay with the header 100 when in the operating position, i.e., when not deployed, so the risk of components of the transport assembly 200 being lost during operation is reduced. The transport assembly 200 provided according to the present disclosure can also be relatively economical compared to optional deployment systems, which may include hydraulics, while still allowing the option of using such deployment systems.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural header for an agricultural vehicle, comprising:
    a header frame;
    at least one cutter carried by the header frame and configured to cut crop material;
    a steering assembly coupled to the header frame and comprising an axle that is pivotably coupled to the header frame; and
    a transport assembly coupled to the header frame, the transport assembly comprising:
        a first arm coupled to the header frame and movable between a first transport position and a first operating position;
        a first wheel mount pivotably coupled to the first arm and configured to mount a first transport wheel thereto, wherein, in the first transport position of the first arm, the first transport wheel is positioned in contact with a ground surface, and, in the first operating position of the first arm, the first transport wheel is raised with respect to the ground surface;
        a second arm pivotably coupled to the header frame and movable between a second transport position and a second operating position;
        a second wheel mount pivotably coupled to the second arm and configured to mount a second transport wheel thereto, wherein, in the second transport position of the second arm, the second transport wheel is positioned in contact with the ground surface, and, in the second operating position of the second arm, the second transport wheel is raised with respect to the ground surface; and
        a linkage coupling the first wheel mount to the second wheel mount,
        wherein pivoting movement of the axle causes a corresponding pivoting movement of the first wheel mount and the second wheel mount,
        wherein the linkage is reversibly coupled to at least one of the first wheel mount or the second wheel mount such that the second arm is movable between the second transport position and the second operating position independently of the first arm being movable between the first transport position and the first operating position when the linkage is uncoupled from at least one of the first wheel mount or the second wheel mount.

2. The agricultural header of claim 1, wherein the linkage comprises a tie rod coupled to the first wheel mount and the second wheel mount.

3. The agricultural header of claim 2, further comprising a cable coupling the tie rod to the axle.

4. The agricultural header of claim 1, wherein the first arm comprises a pair of first forks defining a first slot therebetween, the first wheel mount is disposed in the first slot, the second arm comprises a pair of second forks defining a second slot therebetween, and the second wheel mount is disposed in the second slot.

5. The agricultural header of claim 4, wherein the first wheel mount defines a length and is pivotably coupled to the pair of first forks adjacent to a center of the length and the second wheel mount is pivotably coupled to the pair of second forks adjacent to a proximal end of the second wheel mount.

6. The agricultural header of claim 5, wherein the first wheel mount comprises a pair of opposite ends each configured to accept a wheel hub and the second wheel mount comprises one end configured to accept a wheel hub.

7. The agricultural header of claim 6, further comprising an actuator coupled to the first arm and configured to move the first arm between the first transport position and the first operating position.

8. The agricultural header of claim 4, wherein the first wheel mount comprises a mounting bracket comprising at least one opening that aligns with a corresponding opening formed in the linkage when the first wheel mount is in a first position and aligns with a corresponding opening formed in each of the first forks when the first wheel mount is in a second position.

9. The agricultural header of claim 1, wherein the first arm is reversibly coupled to the second arm such that the first arm is movable to the first operating position when uncoupled from the second arm and held in the first transport position when coupled to the second arm.

10. An agricultural vehicle, comprising:
    a chassis; and
    an agricultural header carried by the chassis, the agricultural header comprising:
        a header frame;
        at least one cutter carried by the header frame and configured to cut crop material;
        a steering assembly coupled to the header frame and comprising an axle that is pivotably coupled to the header frame; and a transport assembly coupled to the header frame, the transport assembly comprising:
    a first arm coupled to the header frame and movable between a first transport position and a first operating position;
    a first wheel mount pivotably coupled to the first arm and configured to mount a first transport wheel thereto, wherein, in the first transport position of the first arm, the first transport wheel is positioned in contact with a ground surface, and, in the first operating position of the first arm, the first transport wheel is raised with respect to the ground surface;
    a second arm pivotably coupled to the header frame and movable between a second transport position and a second operating position;
    a second wheel mount pivotably coupled to the second arm and configured to mount a second transport wheel thereto, wherein, in the second transport position of the second arm, the second transport wheel is positioned in contact with the ground surface, and, in the second operating position of the second arm, the second transport wheel is raised with respect to the ground surface; and
    a linkage coupling the first wheel mount to the second wheel mount,
    wherein pivoting movement of the axle causes a corresponding pivoting movement of the first wheel mount and the second wheel mount,
    wherein the linkage is reversibly coupled to at least one of the first wheel mount or the second wheel mount such that the second arm is movable between the second transport position and the second operating position independently of the first arm being movable between the first transport position and the first operating position when the linkage is uncoupled from at least one of the first wheel mount and the second wheel mount.

11. The agricultural harvester of claim 10, wherein the linkage comprises a tie rod coupled to the first wheel mount and the second wheel mount.

12. The agricultural harvester of claim 11, further comprising a cable coupling the tie rod to the axle.

13. The agricultural harvester of claim 10, wherein the first arm comprises a pair of first forks defining a first slot therebetween, the first wheel mount is disposed in the first slot, the second arm comprises a pair of second forks defining a second slot therebetween, and the second wheel mount is disposed in the second slot.

14. The agricultural harvester of claim 13, wherein the first wheel mount defines a length and is pivotably coupled to the pair of first forks adjacent to a center of the length and the second wheel mount is pivotably coupled to the pair of second forks adjacent to a proximal end of the second wheel mount.

15. The agricultural harvester of claim 14, wherein the first wheel mount comprises a pair of opposite ends each configured to accept a wheel hub and the second wheel mount comprises one end configured to accept a wheel hub.

16. The agricultural harvester of claim 15, further comprising an actuator coupled to the first arm and configured to move the first arm between the first transport position and the first operating position.

17. The agricultural harvester of claim 13, wherein the first wheel mount comprises a mounting bracket comprising at least one opening that aligns with a corresponding opening formed in the linkage when the first wheel mount is in a first position and aligns with a corresponding opening formed in each of the first forks when the first wheel mount is in a second position.

18. The agricultural harvester of claim 10, wherein the first arm is reversibly coupled to the second arm such that the first arm is movable to the first operating position when uncoupled from the second arm and held in the first transport position when coupled to the second arm.

* * * * *